M. H. EMMERICH.
ADJUSTABLE SCREW CONVEYER HANGER.
APPLICATION FILED OCT. 1, 1910.
1,002,378.
Patented Sept. 5, 1911.
2 SHEETS—SHEET 1.
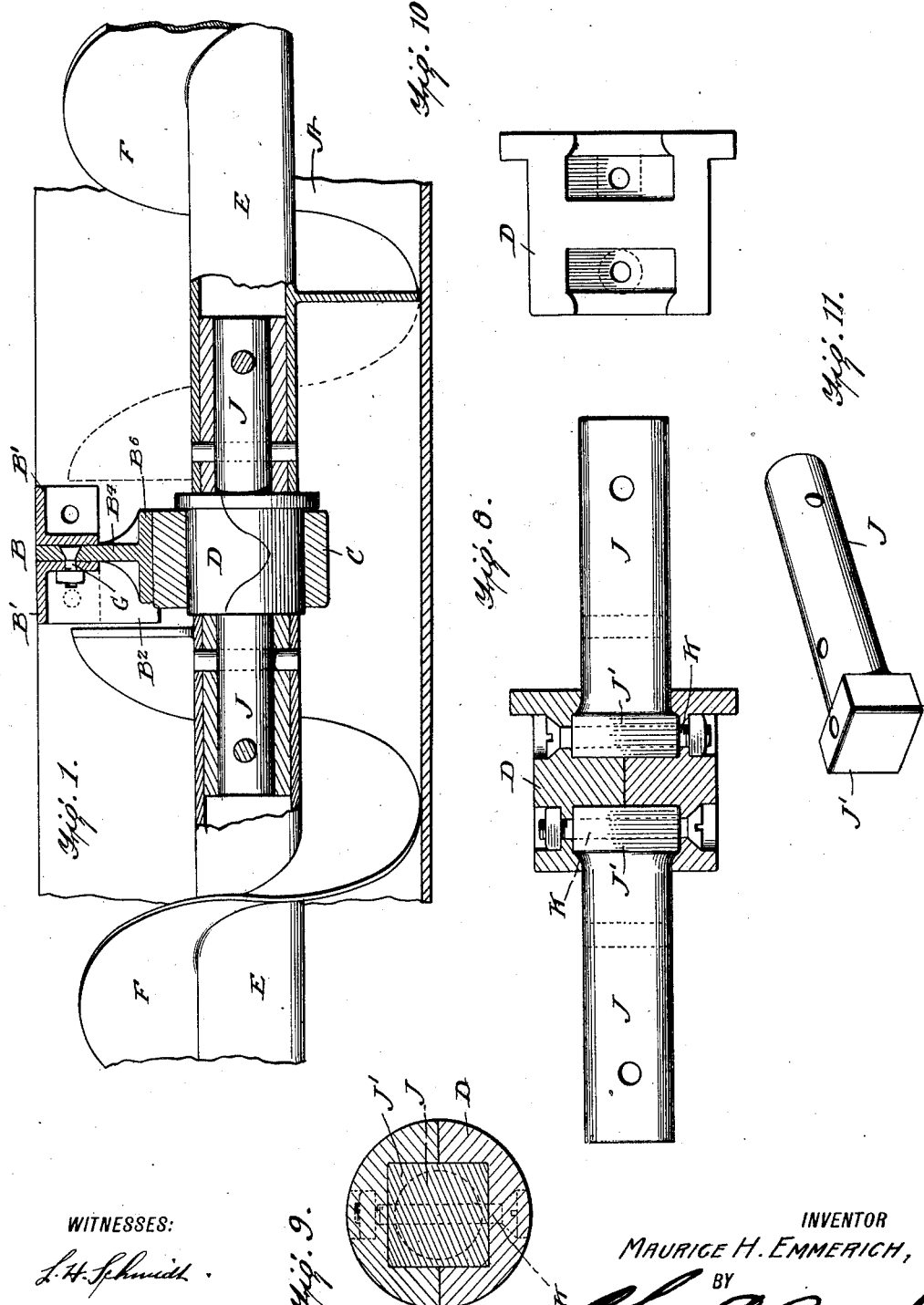
WITNESSES:
INVENTOR
MAURICE H. EMMERICH,
BY
ATTORNEY

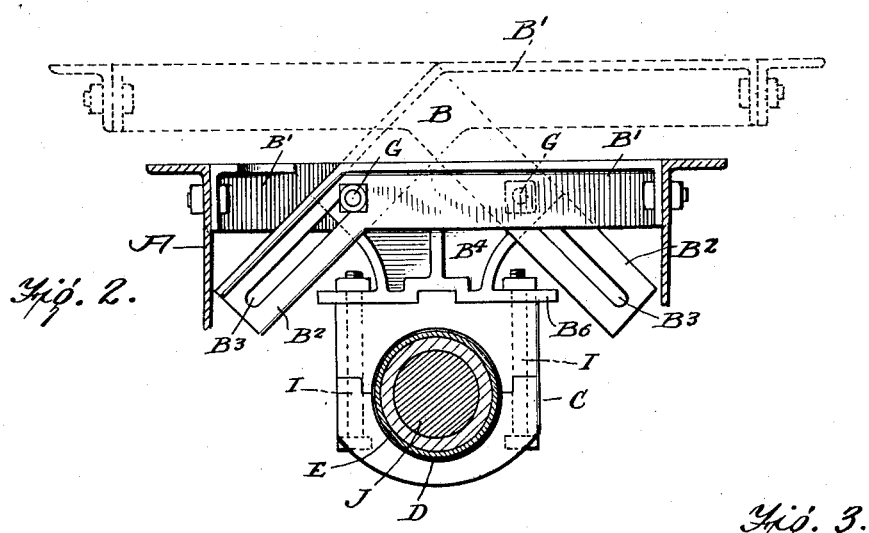
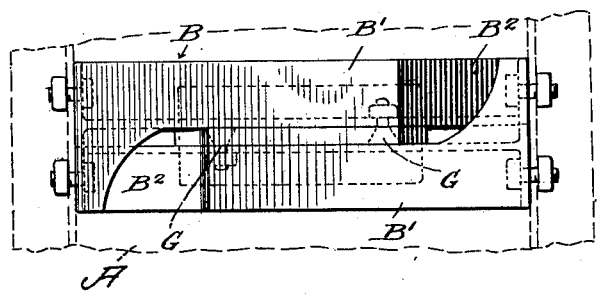
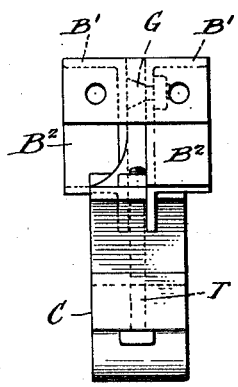
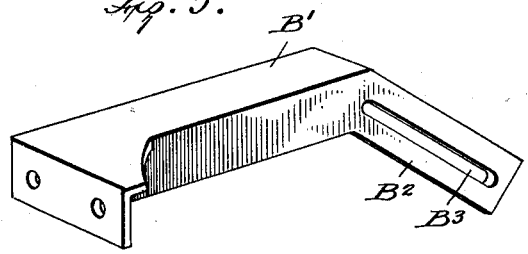
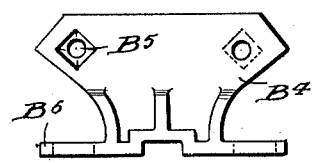

UNITED STATES PATENT OFFICE.

MAURICE H. EMMERICH, OF LA SALLE, ILLINOIS.

ADJUSTABLE SCREW-CONVEYER HANGER.

1,002,378.  Specification of Letters Patent.  Patented Sept. 5, 1911.

Application filed October 1, 1910.  Serial No. 584,910.

*To all whom it may concern:*

Be it known that I, MAURICE H. EMMERICH, a citizen of the United States, residing at La Salle, in the county of Lasalle and State of Illinois, have invented a new and useful Improvement in an Adjustable Screw-Conveyer Hanger, of which the following is a specification.

This invention relates to certain new and useful improvements in adjustable screw conveyer hangers and couplings, the object being to provide a hanger which can be adjusted to suit any size conveyer casing, or boxes in order to support the bearing in the proper position within the box.

Another object of my invention, is to provide a novel form of coupling member in connection with the hanger, whereby the conveyer shaft can be easily and quickly coupled or uncoupled without disconnecting the drive gear or chain in order to replace a broken shaft, as is the case with couplers now in use, as in order to replace the broken shaft it is necessary to disconnect all the hangers in order to allow the shaft to be moved longitudinally within the casing or box.

Another object of my invention is to provide a hanger, which is exceedingly simple and cheap in construction, and one which is very strong and durable, the hanger arms being so mounted, and connected to the hanger proper that the journal box will be supported in a very rigid manner, and at the same time be capable of being adjusted.

Another object of my invention is to provide a coupling which is formed of two sections which are so connected to the coupling shaft that the shaft will be rigidly locked between the coupling members, and at the same time a bearing is formed by the coupling.

With these objects in view, the invention consists in the novel features of construction, combination and arrangement of parts, hereinafter fully described and pointed out in the claims.

In the drawing forming a part of this specification: Figure 1 is a longitudinal section through a portion of a conveyer casing or box, showing my improved hanger and coupling arranged therein. Fig. 2 is a transverse section casing being broken away. Fig. 3 is a top plan view. Fig. 4 is a side elevation. Fig. 5 is a perspective view of one of the hanger arms. Fig. 6 is a front view of the hanger proper. Fig. 7 is an inverted plan view of the same. Fig. 8 is a longitudinal vertical section partly in elevation. Fig. 9 is a transverse section. Fig. 10 is a top plan view of one of the coupling sections. Fig. 11 is a perspective view of one of the coupling shafts.

Referring to the drawing, A indicates the upper portion of the conveyer casing or box, B the hanger, C the journal box, D the coupling and E the conveyer shafts, which are provided with the usual spiral F.

The hanger comprises a pair of arms B' formed of angle bars, and provided with depending angle ends $B^2$, provided with slots $B^3$, said arms being secured to the casing by bolts slightly spaced apart with their smooth faces opposite each other, and between which the hanger $B^4$ is mounted, which is provided with transverse bores $B^5$ surrounded by square sockets upon opposite sides, in which the heads of supporting bolts G, are adapted to fit which extend through the slots of the arms, and are locked by nuts in such a manner that the hanger $B^4$ will be supported between the same in a very rigid manner, and at the same time be capable of being adjusted, as by shifting the position of the arms in respect to the box, the hanger will adjust itself to any size box. The hanger is provided with a plate portion $B^6$ having a wedge shape groove, and provided with slots through which bolts I are adapted to pass for supporting the journal box C, which is formed of two sections, the upper section being provided with a wedge shaped tongue adapted to fit within the wedge shaped groove of the hanger $B^4$. It will be seen that by this construction, the box can be easily and quickly removed, and the hanger detached from the arms in order to allow the conveyer shaft coupling to be detached, as will be hereinafter fully described.

The coupling D, comprises a sleeve formed of two sections, one section being provided with recesses, and the other with tongues adapted to fit therein, so as to prevent the sections from moving longitudinally in respect to each other, and said coupling is provided with a flange which is adapted to co-act with the journal box for preventing the same from moving within the same. The coupling forms a bearing, which is adapted to revolve within the journal box, and is provided with semi-circular grooves, and square recesses adapted to receive the coupling shafts J and square heads J' which are locked therein by bolts K extending transversely through the section of the sleeves, for locking the sections together, and said bolts are countersunk within the coupling in order to form a smooth bearing. The coupling shafts are provided with transverse bores, adapted to aline with bores formed in the ends of the conveyer shafts through which bolts or pins are adapted to pass for locking the coupling shaft J in position within the ends of the conveyer shafts E, in such a manner that the ends of the conveyer sections will be locked together, in such a manner that they can be easily and quickly connected, or disconnected.

From the foregoing description, it will be seen that I have provided a conveyer handle and coupling, which is especially constructed in order to allow the conveyer sections to be easily and quickly connected, or disconnected in such a manner that any one of the sections can be readily removed in case of one of the sections becoming broken without removing the adjacent sections.

What I claim is:—

1. In a device of the kind described, the combination with a conveyer box, of a pair of arms provided with slotted angle ends carried by the box, a hanger carrying bolts extending through the slots of said arms, a journal box carried by said hanger, and a coupling mounted in said journal box.

2. In a device of the kind described, the combination with a conveyer box, of an adjustable hanger carried by the box, a journal box carried by said hanger, and a sectional coupling mounted in said journal box.

3. In a device of the kind described, the combination with a conveyer box, of an adjustable hanger mounted in said box, a sectional journal box carried by said hanger, a sectional coupling mounted in said journal box, said coupling carrying coupling shafts connecting the ends of the conveyer shafts.

4. A device of the kind described comprising a hanger carrying a journal box coupling mounted in said journal box comprising a sectional sleeve having faces and provided with recesses, coupling shafts mounted in said grooves provided with square heads fitting in said recesses, and bolts extending transversely through said sleeve, and heads.

5. The combination with a conveyer box of a pair of arms carried by said box, provided with depending slotted portions, a hanger carrying bolts mounted in said slots, said hanger being provided with a plate at its lower end, a sectional journal box carried by said plate, and a coupling member mounted within said journal box, said coupling member comprising a sectional sleeve having means for securing the coupling shafts therein.

6. The combination with the meeting ends of a pair of conveyer shafts, of coupling shafts fixed in the ends of said conveyer shafts provided with square heads, a sectional coupling member arranged over said coupling shafts, bolts extending transversely through said coupling member and shafts, and an adjustable hanger carrying a journal box for supporting said coupling member.

7. A coupling for conveyer shafts, comprising a sectional sleeve, each section being provided with a groove and a recess, coupling shafts arranged in said groove having heads seated within said recesses, bolts extending transversely through said coupling member and coupling shafts, and an adjustable hanger carrying a journal box adapted to receive said coupling member.

8. A conveyer hanger, a hanger comprising a pair of arms having slotted portions, a hanger carrying bolts mounted within said slotted portions, said hanger being provided with a plate at its lower end, a sectional journal box carried by said plate, a sectional coupling member mounted in said journal box, said coupling member having means for receiving the ends of the coupling shafts of the conveyer shafts.

MAURICE H. EMMERICH.

Witnesses:
ROBERT E. BYRNES,
ROBT. F. HERRCKE.

Copies of this patent may be obtained for five cents each, by addressing the "Commissioner of Patents, Washington, D. C."